ns Patent Office 2,801,569
Patented Aug. 6, 1957

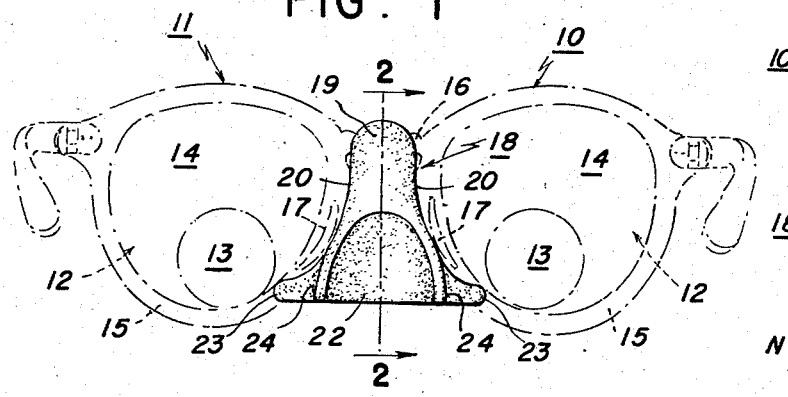
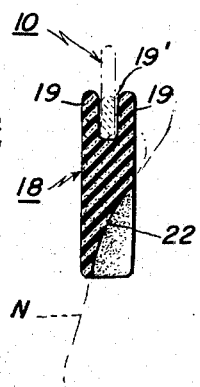
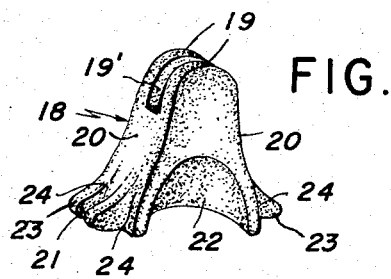
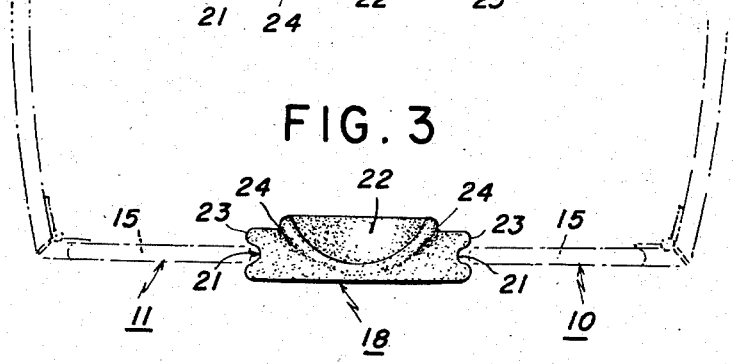
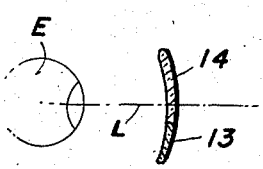
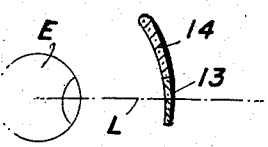
INVENTOR,
EDWIN A. RALPH,
ATTORNEY.

2,801,569
NOSE POSITIONING RISER FOR BIFOCAL EYEGLASSES

Edwin A. Ralph, Lakewood, N. Y.

Application June 16, 1954, Serial No. 437,099

2 Claims. (Cl. 88—51)

This invention relates to means in the nature of a comfortably worn attachment for either rim or rimless spectacles or eye-glasses to rest on the wearer's nose and which is engageable with the bridge of the eyeglasses and is in the nature of a riser to elevate the eyeglasses to dispose the close-range lens areas thereof in the line of direct or normal vision as is so often desirable by the wearer for close observation as for example in reading, manipulating musical or other instruments, surgery, sewing, applying cosmetics in the case of women, and in shaving in the case of men.

A prime aim is to provide a construction which may be made in a single size and yet fit practically all commercial sizes of eyeglasses.

One important object is to provide such a device or means which will permit selective disposition or support of eyeglasses so elevated in a plurality of different positions laterally of the face of the wearer, that is shifted from side to side with at least one close range lens remaining in the line of vision in all positions, to enable the wearer to localize his view of the sides or portions of the face and without undue obstruction by the eyeglasses. This result especially facilitates the application of cosmetics and shaving procedure.

Again it is aimed to provide such a riser as is relatively wide at the base to enable said shifting from side to side and support of the eyeglasses in the different positions mentioned, and also with means or shaped to contact the bridge of the wearer's nose in any or all positions.

Another object is to provide such a riser or means attachable to the eyeglass frame for unitary manipulation therewith, and which is capable of manufacture in a single piece as by molding from sponge rubber or the equivalent and generally in wedge formation so that a single size may be compressed to fit practically all sizes of eyeglasses.

One more object is to provide such a riser which is slotted at the top and sides to provide flanges to clasp the bridge of the eyeglasses and prevent undesired relative swinging movement of the latter and riser.

Various additional objects and advantages will become apparent from a consideration of the description following taken in connection with the accompanying drawings illustrating one operative embodiment.

In said drawings:

Fig. 1 is a rear elevation of conventional eyeglasses with my improved riser clasped in place thereon, the former being shown in dotted lines;

Fig. 2 is a vertical section taken on the line 2—2 of Fig. 1;

Fig. 3 is a bottom or inverted plan view of the parts of Fig. 1;

Fig. 4 is a perspective view of the riser; and

Figs. 5 and 6 are diagrammatic views contrasting the field of vision through which the optic nerve records, respectively representing normal use of bifocal lenses and the use of such lenses when my invention is employed.

Referring specifically to the drawings wherein like reference characters designate like or corresponding parts throughout the different views, a pair of conventional eyeglasses or spectacles (either of which terms is used hereafter without distinction), which may either be of the rim or rimless type, is suggested in dotted lines at 10. Specifically, such eyeglasses have a frame 11 and bifocal lenses 12, of which 13 are the close vision portions and 14 are the distant vision portions. Frame parts 15 mount said lenses, being connected by a bridge 16. Said parts 14 usually have nose-gripping flanges 17.

The instant invention provides a riser or body 18 capable of manufacture in one piece of sponge or other rubber, any equivalent elastic or substituted material capable of compression and especially in the case of rubber preferably having an outer surface or skin which is smooth and which is often smoother than the interior. Such riser or body 18 is generally of wedge shape, has a relatively wide base and is adapted to be slightly wedged or compressed into place on the eyeglass as in Figs. 1 and 3. While the riser is readily applicable to and separable from the eyeglasses, it is adapted to be carried by and handled unitarily with the eyeglasses when in use.

Said riser or body 18 is slotted inwardly at 19' at its upper extremity to provide flanges 19 which receive and detachably clasp the bridge 16. The concave sides 20 of said riser may wedge between and also grip said flange 17 of frame 11, and further the end extremities at the base of the riser are slotted at 21 to receive adjacent portions of the frame to prevent swinging displacement or relative movement of the eyeglasses and riser forwardly and rearwardly on the axis of the bridge 16 and with respect to the nose of the user suggested at N in Fig. 2. In fact the flanges provided by the slots 21 may even grip or clasp the engaged portions of the frame of the eyeglasses if desired.

It will be noted particularly from Figs. 2 and 3 that the back or rear of riser 1 is recessed or cut away at 22 for a better supporting fit on the nose.

The width of the riser is reduced at the back or rear adjacent slots 21 which provides flanges 23. Notches 24 outwardly of said flanges 23 enable the eyeglasses to be elevated and supported from the nose selectively in three different lateral positions.

In the normal use of the eyeglasses 10, that is without the aid of the riser, the line of vision L, as shown in Fig. 5, from the eye E passes through the distant area or portion 14 of the lens. When the riser 18 is used, said line of vision L will pass from the eye E through the close range area 13 of the lens as suggested in Fig. 6 to enable the use of the close range area by the wearer for close observation and for example in reading, manipulating various instruments, surgery, sewing, applying cosmetics and in shaving.

When the riser is to be used it is readily pressed into the position shown in Figs. 1 and 2, through a sliding movement initiated from below. As a result, the riser clasps or grips the eyeglasses and so remains in order to be handled unitarily therewith until detached. When thus attached, the bridge 16 is gripped or clasped by the flanges 16 and any undesirable swinging movement of the eyeglasses and riser toward and from the nose is provided by the flanges 23 at the opposite sides of the slots 21, and if desired the eyeglasses may be gripped or clasped by the walls of such flanges 23. Further, the wedging of the riser into place will cause portions of the concave faces 20 to frictionally grip the inner surfaces of the nose gripping flanges 17 of the eyeglasses as well as parts 14.

Particular attention is called to the fact that the riser is not only able to seat on the user's nose N as suggested in dotted lines in Fig. 2, but may also rest upon the user's nose in any of three different positions, the other positions being selectively at the notches 24. Thus, when the nose supports the eyeglasses at the left hand notch 24, the left hand lens is closer than normal to the nose and an adjacent portion of the face of the wearer is exposed in the case of women for the relatively unobstructed application of cosmetics, for instance, or to facilitate shaving of the corresponding portion of the face in the case of men. Should the eyeglasses be supported with the nose engaging the right hand notch 34, the right hand lens will be closer than normal to the nose, thus exposing an adjacent portion of the face in the case of women to facilitate relatively unobstructed application of cosmetics or in the case of men facilitating shaving.

Various changes may be resorted to, provided they fall within the spirit and scope of the invention.

The instant construction especially in view of its compressibility may be made in a single rise and yet fit practically all commercial sizes of eyeglasses.

I claim as my invention:

1. A riser for bifocal eyeglasses adapted to support on the nose, the riser being a body made of an elastomer and having an approximately triangular shape in the plane of the eyeglasses, said body having a recess at the nasal surface thereof to enable disposition thereof with one corner uppermost and with one side lowermost and approximately horizontal, said one corner having a slot to receive the bridge of the eyeglasses, each of the remaining corners of the riser having a pair of laterally extending flanges, each said second mentioned pair of flanges having a slot between them to receive the lens means of the eyeglasses at a location below the said bridge, and said riser being of such thickness adjacent said second-mentioned flanges as locates the latter flanges forwardly of the nasal surface of the riser that at the junction of the adjacent portions of the riser they coact with the adjacent laterally extending flanges to provide notches for location of the riser on the nose at either side thereof independently of the recess.

2. A riser for bifocal eyeglasses adapted for support on the nose, the riser being a body made of an elastomer and having an approximately triangular shape in the plane of the eyeglasses, said body having a recess at the nasal surface thereof to enable disposition with one corner uppermost and with one side lowermost and approximately horizontal, said one corner having flanges and a slot between them to receive the bridge of the eyeglasses, each of the remaining corners of the riser having a pair of laterally extending flanges, each said second-mentioned pair of flanges having a slot between them to receive the lens means of the eyeglasses at a location below the said bridge to prevent relative swinging of the eyeglasses and riser, the said slots of the second-mentioned pair of flanges being approximately coplanar and open marginally of the riser, and said riser being of such thickness adjacent said second-mentioned flanges as locates the latter flanges forwardly of the nasal surface of the riser that at the junction of the adjacent portions of the riser they co-act with the adjacent laterally extending flanges to provide notches for location of the riser on the nose at either side thereof independently of the recess.

References Cited in the file of this patent

UNITED STATES PATENTS

| | | |
|---|---|---|
| 2,459,051 | Smith | Jan. 11, 1949 |
| 2,582,345 | Moeller | Jan. 15, 1952 |
| 2,612,076 | Dietz | Sept. 30, 1952 |

FOREIGN PATENTS

| | | |
|---|---|---|
| 611,881 | Great Britain | Nov. 4, 1948 |